United States Patent
Yang et al.

(10) Patent No.: US 8,792,328 B2
(45) Date of Patent: Jul. 29, 2014

(54) RADIO-LINK RELIABILITY USING MULTI-CARRIER CAPABILITY IN WIRELESS BROADBAND SYSTEMS

(75) Inventors: Xiangying Yang, Portland, OR (US); Kamran Etemad, Potomac, MD (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 12/822,643

(22) Filed: Jun. 24, 2010

(65) Prior Publication Data

US 2011/0110227 A1    May 12, 2011

Related U.S. Application Data

(60) Provisional application No. 61/259,086, filed on Nov. 6, 2009.

(51) Int. Cl.
*H04L 5/00* (2006.01)
(52) U.S. Cl.
CPC ..................................... *H04L 5/006* (2013.01)
USPC ....... 370/216; 370/242; 455/67.1; 455/168.1; 455/553.1
(58) Field of Classification Search
CPC ..................................................... H04L 5/006
USPC ..................... 370/216, 242; 455/115.1, 67.11
See application file for complete search history.

(56) References Cited

U.S. PATENT DOCUMENTS

| | | | | |
|---|---|---|---|---|
| 7,245,680 | B2 * | 7/2007 | Dimsdle | 375/350 |
| 2007/0045425 | A1 * | 3/2007 | Yoshida et al. | 235/492 |
| 2008/0039032 | A1 * | 2/2008 | Haumont | 455/115.1 |
| 2008/0254787 | A1 | 10/2008 | Tsao et al. | |
| 2008/0287068 | A1 | 11/2008 | Etemad | |
| 2008/0316969 | A1 | 12/2008 | Prakash et al. | |
| 2009/0232010 | A1 | 9/2009 | Li et al. | |
| 2009/0233564 | A1 | 9/2009 | Greenberg et al. | |
| 2010/0235890 | A1 * | 9/2010 | Cakulev et al. | 726/5 |
| 2010/0296389 | A1 * | 11/2010 | Khandekar et al. | 370/216 |
| 2011/0021154 | A1 * | 1/2011 | Marinier et al. | 455/67.11 |
| 2011/0026475 | A1 * | 2/2011 | Lee et al. | 370/329 |
| 2011/0053588 | A1 * | 3/2011 | Al-Khudairi et al. | 455/424 |

FOREIGN PATENT DOCUMENTS

| | | |
|---|---|---|
| CN | 1731882 A | 2/2006 |
| WO | 2011/039969 A1 | 4/2011 |

OTHER PUBLICATIONS

Shrivastava et al., "Group Resource Allocation Techniques for IEEE 802.16M", U.S. Appl. No. 12/651,338, filed Dec. 31, 2009.
Examination Report received for United Kingdom Patent Application No. 1017156.9, mailed on Sep. 29, 2011, 1 page.
Office Action Received for Japanese Patent Application No. 2010-248598 mailed on Apr. 3, 2012, 3 pages of Office Action and 2 pages of English Translation.
Office Action issued Mar. 28, 2013 from Chinese Patent Application No. 201010537547.7.
Office Action issued Sep. 2, 2013 from Chinese Patent Application No. 201010537547.7.
Office Action issued Nov. 18, 2013 in German Patent Application No. 10 2010 050 273.1.
Office Action issued Jan. 28, 2014 from Chinese Patent Application No. 201010537547.7.

* cited by examiner

*Primary Examiner* — Wanda Z Russell
(74) *Attorney, Agent, or Firm* — Schwabe, Williamson & Wyatt, P.C.

(57) ABSTRACT

Embodiments of a system and methods for improving radio link reliability using multi-carrier capability in wireless systems are generally described herein. Other embodiments may be described and claimed.

12 Claims, 5 Drawing Sheets

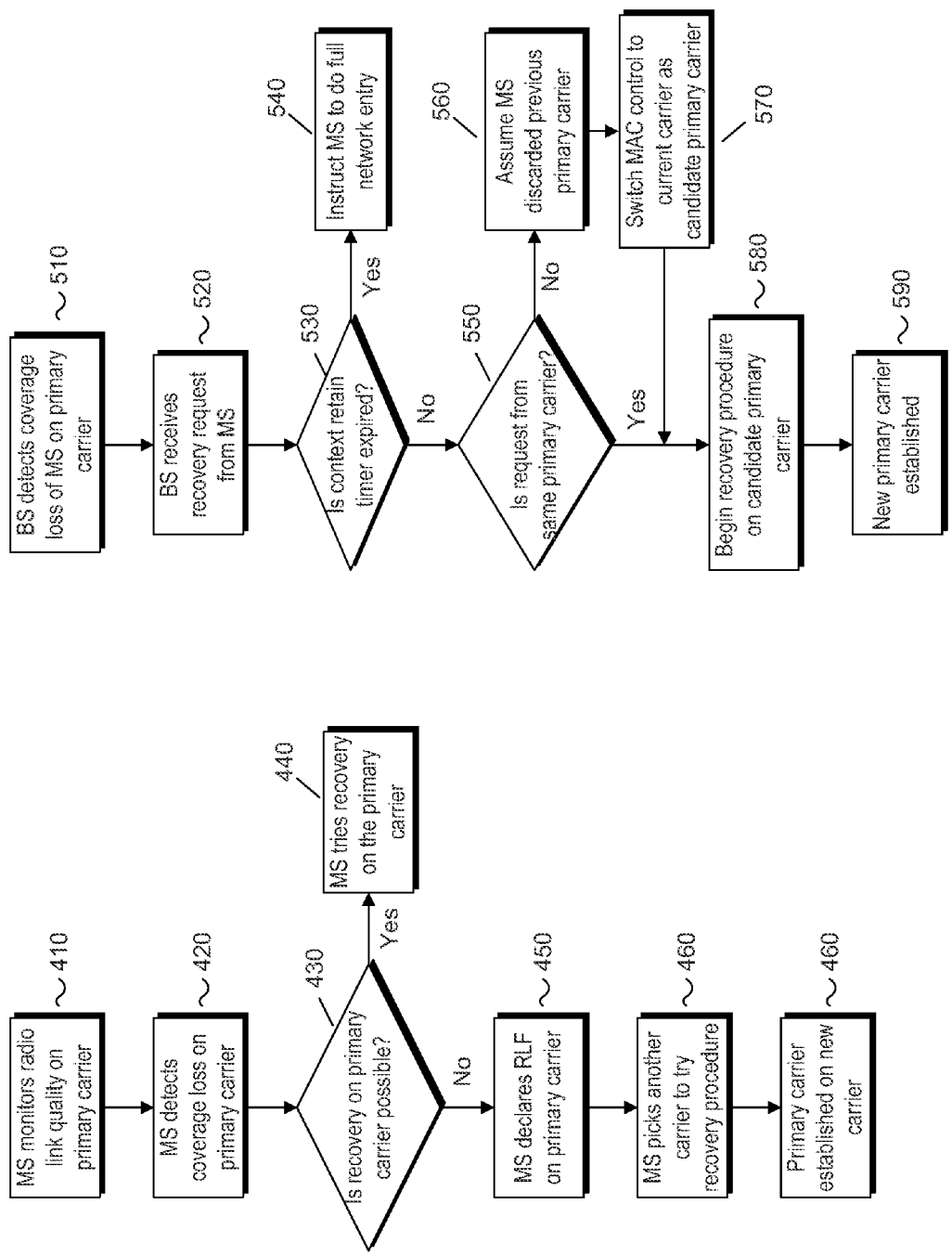

RADIO-LINK RELIABILITY USING MULTI-CARRIER CAPABILITY IN WIRELESS BROADBAND SYSTEMS

CLAIM OF PRIORITY

The present application claims priority to provisional application 61/259,086 filed Nov. 6, 2009, which is incorporated by reference in its entirety.

FIELD OF THE INVENTION

This application relates to wireless systems and, more particularly, to improving a reliability of a radio link in a wireless network using carrier switching.

BACKGROUND

In wireless communications systems, a wireless device, platform, user equipment (UE), mobile station (MS) or advanced mobile station (AMS) performs network entry with a base station (BS) or advanced base station (ABS) to access a wireless network. The network entry procedure is established over a channel, or a primary carrier. The MS and the BS may be capable of communication over a plurality of carriers, wherein the plurality of carriers comprises the primary carrier and one or more secondary carriers. Communications and control information established over the primary carrier may be compromised, resulting in a degradation of service and in some instances, a loss of coverage. If this occurs, the MS may lose a communication link with the BS over the primary carrier, even if one or more secondary carriers still provide reasonable link quality.

BRIEF DESCRIPTION OF THE DRAWINGS

The present invention is illustrated by way of example and not as a limitation in the figures of the accompanying drawings, in which:

FIG. 4 is a diagram illustrating recovery of a radio link according to some embodiments;

FIG. 5 is a diagram illustrating recovery of a radio link according to some embodiments;

DETAILED DESCRIPTION

Figure 1:
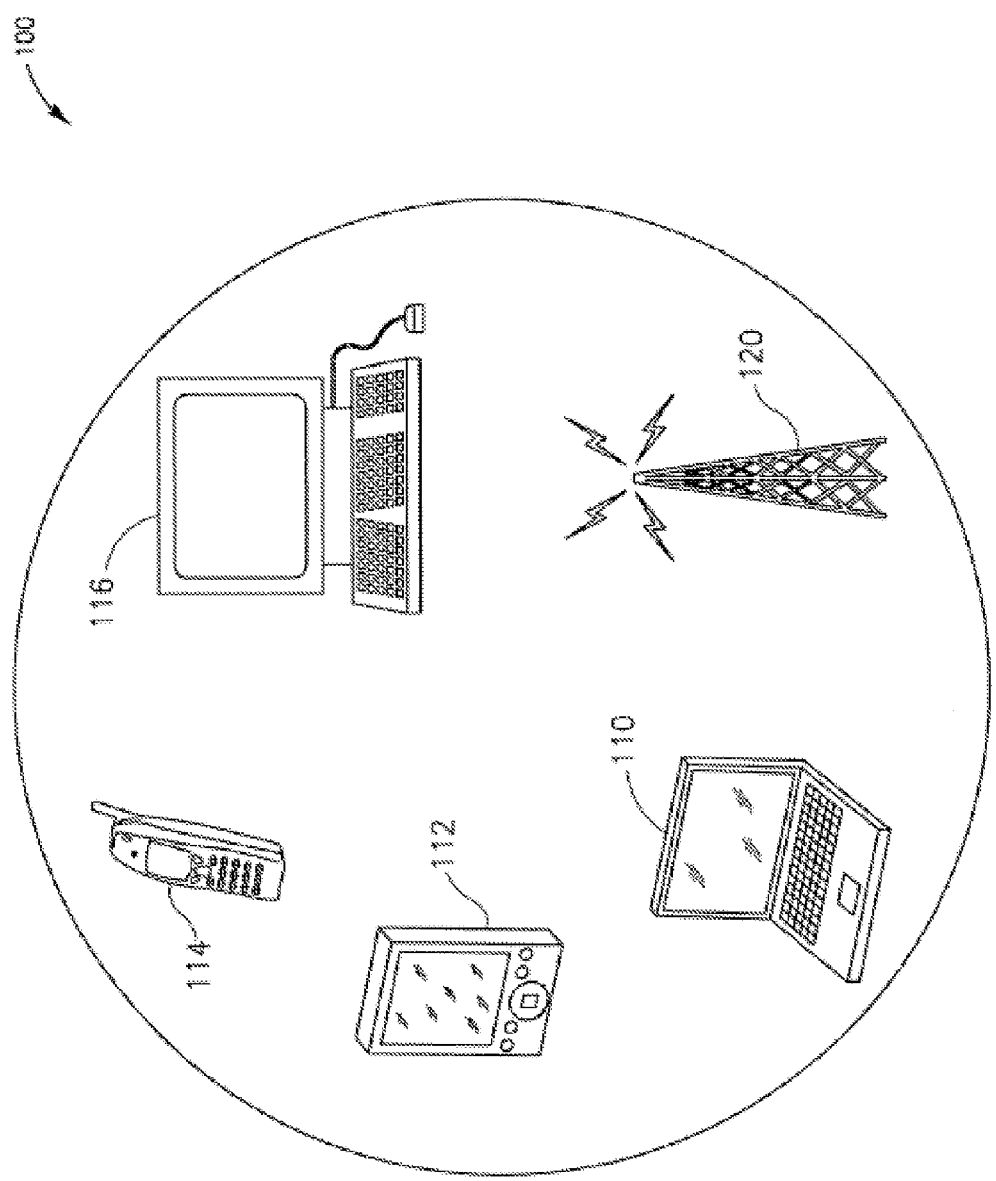
FIG. 1 is a schematic illustration of a wireless network according to some embodiments.

In the following detailed description, numerous specific details are set forth in order to provide a thorough understanding of the invention. However it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

The following detailed description describes various embodiments of the invention in relation to improving reliability of communications in a wireless network using a multicarrier station (STA) or user equipment (UE). While example embodiments are described herein in relation to stations having multi-carrier capabilities the invention is not limited thereto and can be applied to other types of stations including stations capable of communication over a single carrier at a single time. Wireless networks specifically include, but are not limited to, wireless local area networks (WLANs), wireless personal area networks (WPANs), and/or wireless wide area networks (WWANs).

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, user equipment (UE), mobile stations (MS), advanced mobile stations (AMS), platforms, base stations (BS), advanced base stations (ABS), access points (APs), gateways, bridges, hubs and cellular radiotelephones. Further, the radio systems within the scope of the invention may include cellular radiotelephone systems, satellite systems, personal communication systems (PCS), two-way radio systems, two-way pagers, personal computers (PCs) and related peripherals, personal digital assistants (PDAs), personal computing accessories and all existing and future arising systems which may be related in nature and to which the principles of the inventive embodiments could be suitably applied.

Communication over a primary carrier may be established using a network entry or reentry procedure. A primary carrier may be a carrier on which a BS and a MS or UE exchange traffic and Physical layer (PHY)/Media Access Control (MAC) layer control information. Further, the primary carrier may be used to communicate control functions for MS operation, such as network entry wherein each MS has a carrier that the MS considers to be its primary carrier in a cell. For communications already established over a primary carrier, a BS may prompt a MS to change from the primary carrier to a secondary carrier, thereby switching the primary carrier to another carrier. The secondary carrier is a carrier that the MS may use to exchange traffic with a BS, based on avocation commands and rules received over the primary carrier of that BS. The secondary carrier may also include control signaling to support multi-carrier operation.

A primary carrier switch involves changing a serving carrier for the MS in a multicarrier BS without changing Media Access Control layer security and mobility contexts, as would otherwise be necessary during network entry or reentry.

The BS may instruct the MS through one or more control messages on the primary carrier to initiate and change the primary carrier for the MS to an assigned fully configured carrier, or target carrier, within the same BS for load balancing purpose and a carriers' varying channel quality. If the MS supports carrier aggregation mode and the target carrier is one of the active secondary carriers of the MS, the MS may receive data and a control signal on the target carrier immediately after switching to the target carrier. Given that a common MAC layer manages both the serving and target primary carriers, network reentry procedures at the target primary carrier is not required. In the event of a radio link failure, which may result from a wireless coverage loss over a primary carrier, it would be helpful for a MS having multi-carrier capabilities to initiate recovery without performing network entry or reentry.

Reference is made to FIG. 1, which schematically illustrates a wireless network 100 according to an embodiment of the present invention. Wireless network 100 may include a base station (BS) 120, and one or more platforms, user equipment (UE), subscriber, mobile, advanced mobile, or other stations 110, 112, 114, and/or 116, which may be for example mobile or fixed mobile stations. Reference herein to the MS 110 may represent stations 110, 112, 114, 116 or the apparatus 130 discussed later in reference to FIG. 2. In some embodiments, base station 120 may be referred to as an advanced base station (ABS), access point (AP), terminal, and/or node, and stations 110, 112, 114, and/or 116 may be referred to as a station (STA), mobile STA (MS), advanced MS (AMS), user equipment (UE), platform, terminal, and/or node. However, the terms base station and mobile station are used merely as an example throughout this specification and their denotation in this respect is in no way intended to limit the inventive embodiments to any particular type of network or protocols. The stations 110, 112, 114, and/or 116 may be configured for communication over a single carrier or over a plurality of carriers, including a primary carrier and one or more secondary carriers. The base station 120 may also be configured for communication over a plurality of carriers.

Wireless network 100 may facilitate wireless access between each of mobile stations 110, 112, 114, and/or 116 and base station 120. For example, wireless network 100 may be configured to use one or more protocols specified in by the Institute of Electrical and Electronics Engineers (IEEE) 8012.11™ standards ("IEEE Standard for Wireless LAN Medium Access Control (MAC) and Physical Layer (PHY) Specification, 1999 Edition", reaffirmed Jun. 12, 2003), such as IEEE 802,11a™-1999; IEEE 802.11b™-1999/Corl2001; IEEE 802.11g™-2003; and/or IEEE 802.11n™, in the IEEE 802.16™ standards ("IEEE Standard for Local and Metropolitan Area Networks—Part 16: Air Interface for Fixed Broadband Wireless Access System", Oct. 1, 2004), such as IEEE 802.162004/Corl-2005 or IEEE Std 802.16-2009, which may herein be referred to as the "IEEE Std 802.16-2009" or "WiMAX" standards, and/or in the IEEE 802.15.1™ standards ("IEEE Standard for Local and Metropolitan Area Networks—Specific Requirements. Part 15.1: Wireless Medium Access Control (MAC) and Physical Layer (PHY) Specifications for Wireless Personal Area Networks (WPANs™), Jun. 14, 2005), although the invention is not limited in this respect and other standards may be used. In some embodiments, attributes, compatibility, and/or functionality of wireless network 100 and components thereof may be defined according to, for example, the IEEE 802.16 standards (e.g., which may be referred to as a worldwide interoperability for microwave access (WiMAX)). Alternatively or in addition, wireless network 100 may use devices and/or protocols that may be compatible with a 3rd Generation Partnership Project (3GPP), Fourth Generation (4G), Long Term Evolution (LTE) cellular network or any protocols for WLANs or WWANs.

Embodiments of the invention may enable the next generation of mobile WiMAX systems (e.g., based on IEEE 802.16m standard) to efficiently support substantially high mobility and low latency applications, such as, for example, Voice-over-Internet Protocol (VoIP), interactive gaming over the air-interface, deployment in larger cell-sizes or lower frequency bands, and/or "multi-hop" relay operations.

In some embodiments, base station 120 may manage and/or control wireless communications among mobile stations 110, 112, 114, and/or 116 and between mobile stations 110, 112, 114, and/or 116 and base station 120. Mobile stations 110, 112, 114, and/or 116 may, in turn, facilitate various service connections of other devices (not shown) to wireless network 100 via a private or public local area network (LAN), although the embodiments are not limited in this respect.

Figure 2:
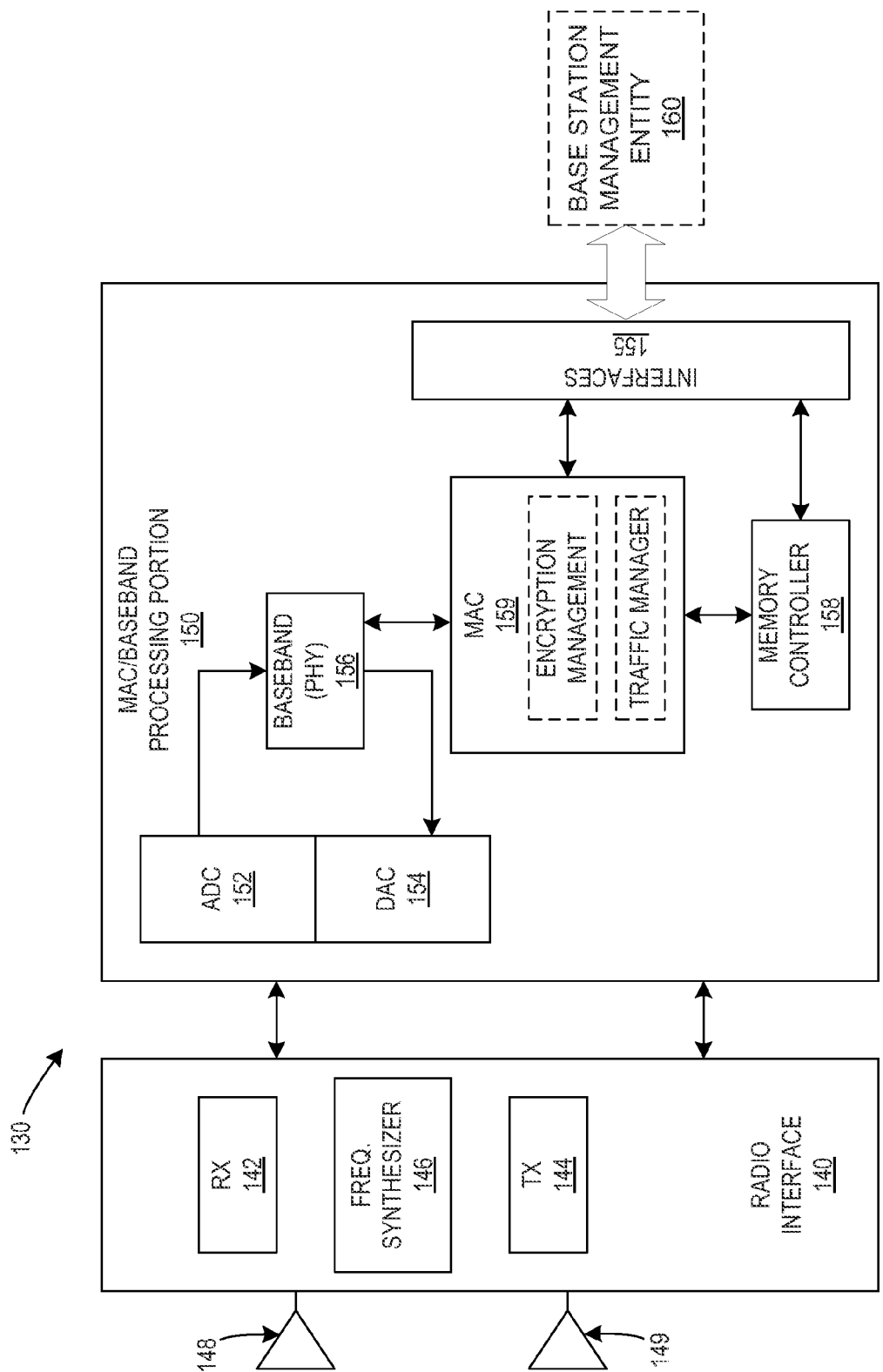
FIG. 2 is a schematic illustration of an apparatus for use in a wireless network according to some embodiments.

Reference is made to FIG. 2, which schematically illustrates an apparatus 130 for use in a wireless network according to an embodiment of the invention. For example, apparatus 130 may be a platform, terminal, device, or node (e.g., one of mobile stations 110, 112, 114, and/or 116, and base station 120, described in FIG. 1) for communicating with other platforms, terminals, devices, or nodes, in a wireless network (e.g., wireless network 100 described in FIG. 1). Apparatus 130 may include a controller or processing circuit 150 including logic (e.g., including hard circuitry, processor and software, or a combination thereof). In some embodiments, apparatus 130 may include a radio frequency (RF) interface 140 and/or a medium access controller (MAC)/baseband processor circuit 150.

In one embodiment, RF interface 140 may include a component or combination of components adapted for transmitting and/or receiving single carrier or multi-carrier modulated signals (e.g., including complementary code keying (CCK) and/or orthogonal frequency division multiplexing (OFDM) symbols) although the inventive embodiments are not limited to any specific over-the-air interface or modulation scheme. RF interface 140 may include, for example, a receiver 142, a transmitter 144 and/or a frequency synthesizer 146. Interface 140 may include bias controls, a crystal oscillator and/or one or more antennas 148 and/or 149. In another embodiment, RF interface 140 may use external voltage-controlled oscillators (VCOs), surface acoustic wave filters, intermediate frequency (IF) filters and/or RF filters, as desired. Due to the variety of potential RF interface designs, an expansive description thereof is omitted.

Processing circuit 150 may communicate with RF interface 140 to process receive and/or transmit signals and may include, for example, an analog-to-digital converter 152 for down converting received signals, a digital-to-analog converter 154 for up converting signals for transmission. Further, processing circuit 150 may include a baseband or physical layer (PHY) processing circuit 156 for PHY link layer processing of respective receive/transmit signals. Processing circuit 150 may include, for example, a processing circuit 159 for medium access control (MAC)/data link layer processing. Processing circuit 150 may include a memory controller 158 for communicating with processing circuit 159 and/or a base station management entity 160, for example, via interfaces 155.

In some embodiments of the present invention, PHY processing circuit 156 may include a frame construction and/or detection module, in combination with additional circuitry such as a buffer memory, to construct and/or deconstruct super-frames. Alternatively or in addition, MAC processing circuit 159 may share processing for certain of these functions or perform these processes independent of PHY processing circuit 156. In some embodiments, MAC and PHY processing may be integrated into a single circuit if desired.

Apparatus 130 may be, for example, a base station, an advanced base station, an access point, a subscriber station, a platform, a mobile station or advanced mobile station, a device, a terminal, a node, a hybrid coordinator, a wireless router, a NIC and/or network adaptor for computing devices or other device suitable to implement the inventive methods, protocols and/or architectures described herein. Accordingly, functions and/or specific configurations of apparatus 130 described herein, may be included or omitted in various embodiments of apparatus 130, as suitably desired. In some embodiments, apparatus 130 may be configured to be compatible with protocols and frequencies associated one or more of the IEEE 802.11, 802.15 and/or 802.16 standards for WLANs, WPANs and/or broadband wireless networks, cited herein, although the embodiments are not limited in this respect.

Embodiments of apparatus 130 may be implemented using single input single output (SISO) architectures. However, as shown in FIG. 2, certain implementations may include multiple antennas (e.g., antennas 148 and 149) for transmission and/or reception using adaptive antenna techniques for beamforming or spatial division multiple access (SDMA) and/or using multiple input multiple output (MIMO) communication techniques.

The components and features of apparatus 130 including a context retain timer may be implemented using any combination of discrete circuitry, application specific integrated circuits (ASICs), logic gates and/or single chip architectures. Further, the features of apparatus 130 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example apparatus 130 shown in the block diagram of FIG. 2 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Figure 3:
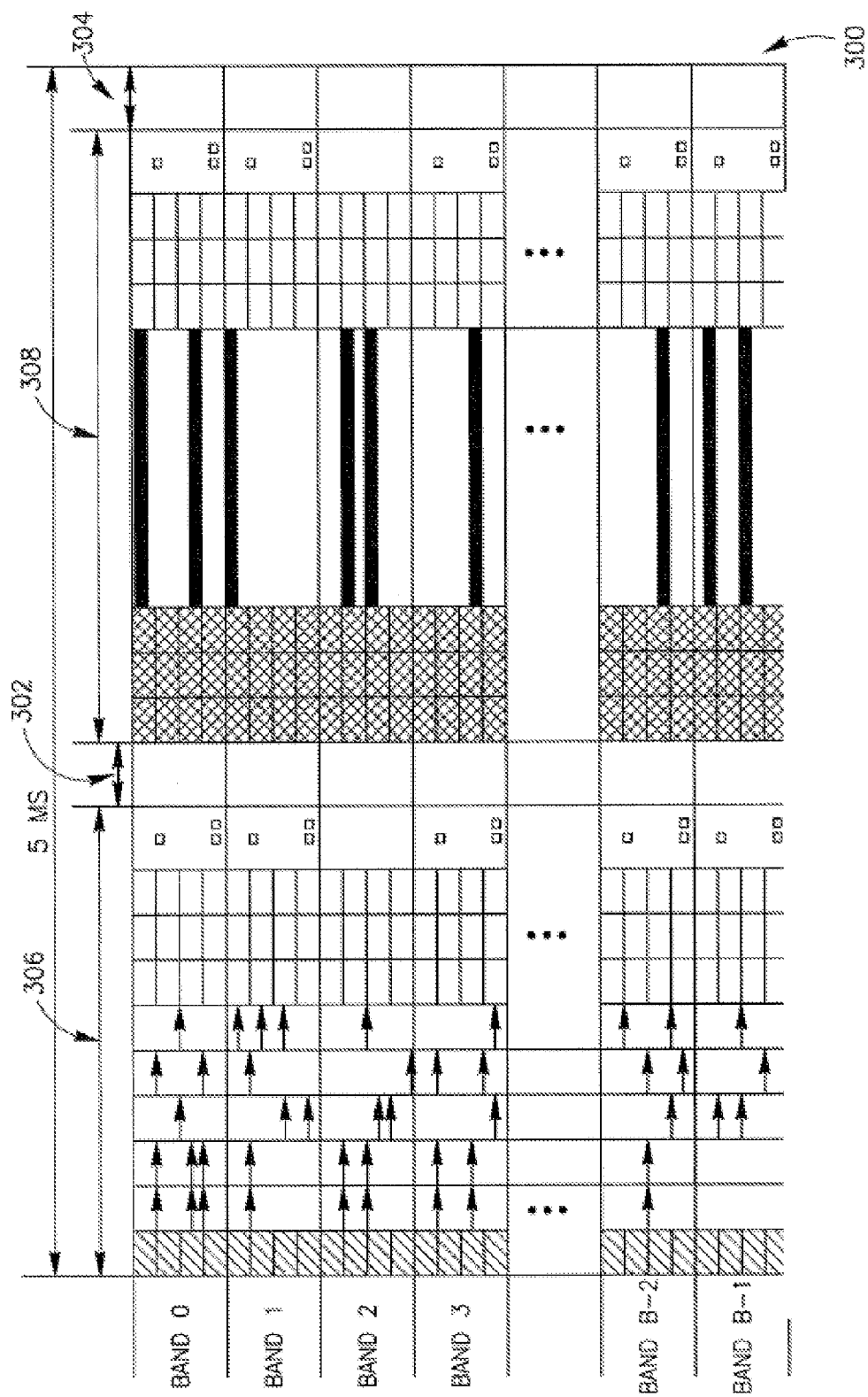
FIG. 3 is a schematic illustration of a frame structure according to some embodiments.

Reference is made to FIG. 3, which schematically illustrates a frame 300 structure according to an embodiment of the invention. Frame 300 (e.g., a radio frame) may be a portion of a transmitted and/or received communication in a wireless network 100 or a multi-layer wireless network as described later in reference to FIG. 4. In some embodiments, frame 300 may describe a periodically repeating segment structure of a larger communication signal or stream. In some embodiments, repeating frame 300 may include substantially different information, for example, during substantially each separate transmission. Frame 300 may be defined and may include broadband wireless access technology according to, for example, the IEEE Std 802.16-2009 or mobile WiMAX profiles. According to the mobile WiMAX profiles, the duration of frame 300 or transmission time interval (TTI) may be, for example, approximately 5 ms. Other frame or radio frame sizes such as for example 2, 2.5, 4, 8, 10, 12, and 20 ms may be used as for example specified in the IEEE Std 802.16-2009 specification.

In some embodiments, frame 300 may be transmitted and/or received, for example, according to a time division duplex (TDD) mode or scheme. Other time and/or frequency schemes may be used (e.g., such as a frequency division duplex (FDD) mode or scheme) according to embodiments of the invention.

Frame 300 may include an integer number of OFDM symbols or other multiplexing symbols. The number of OFDM symbols per frame may be determined, for example, according to a choice of OFDM numerology (e.g., sub-carrier spacing, cyclic prefix length, sampling frequency, etc.). In some embodiments, OFDM numerologies may be determined, set, or obtained, for example, depending, on a bandwidth and sampling frequency (e.g., or an over-sampling factor according to the mobile WiMAX profiles). In various embodiments, substantially different OFDM numerologies may be used, which may result in substantially different number of OFDM symbols in frame 300.

In some embodiments, frame 300 may include idle symbols and/or idle time slots. In one embodiment, frame 300 may include one or more switching periods 302 and/or 304, for example, for changing between a pre-designated downlink (DL) transmission 306 and a pre-designated uplink (UL) transmission 308 when a TDD duplex mode or scheme is used. In other embodiments, for example, when an FDD duplex scheme is used, since DL transmissions 306 and UL transmissions 308 may be sent substantially at the same or overlapping times (e.g., over different frequencies or network channels) frame 300 may include substantially few or no idle symbols, idle time slots, and/or switching periods 302 and/or 304.

In some embodiments, the TTI or the duration of frame 300 may be, for example, approximately 5 ms. A round trip time (RTT) (e.g., the time interval between two consecutive pre-scheduled DL transmissions 306 to a specific wireless node may be, for example, approximately 10 ms. Wireless networks (e.g., wireless network 100) having rapidly changing channel conditions and/or small coherence times (e.g., rapidly moving mobile stations or nodes, such as automobiles having vehicular speeds of, for example, in the excess of approximately 120 kilometers per hour (km/h)) may use mechanisms for supporting substantially high mobility in varying channel conditions. Embodiments of the invention may support wireless network 100 having substantially small round trip times, for example, to enable substantially fast-varying channel condition feedback between mobile stations 110, 112, 114, and/or 116 and base station 120. Other time durations may be used.

The current IEEE Std 802.16-2009 specification standard frame structure may include restrictions, such as substantially long TTIs that are typically not suitable for supporting substantially fast feedback and low access latency (e.g., less than 10 ms), which may be used by, for example, emerging radio access technologies.

Embodiments of the present invention may include or use a modified version of the frame 300 structure for supporting lower latency operations, while maintaining backward compatibility, for example, to the IEEE Std 802.16-2009 specification frame structure. Frame 300 structure may be used, for example, in the next generation of mobile WiMAX systems and devices (e.g., including the IEEE 802.16m standard). In some embodiments, frame 300 structure or portions thereof may be transparent to the legacy terminals (e.g., which operate according to mobile WiMAX profiles and IEEE Std 802.16-2009) and may be used only for communication between BSs, mobile stations, and/or MSs that both operate based on the IEEE 802.16m standard.

According to embodiments of the invention, the frame structure may include synchronization and broadcast channels and the mobile stations may have to parse or decode the common control channel (e.g., media access protocol (MAP) frame portion) for acquiring system configuration information to determine uplink (UL) and downlink (DL) allocations.

Failure of a radio link in a cell or coverage area over a primary carrier may not be promptly reported by a MS 110 if communication is lost with a BS 120 over the primary carrier. It would be helpful for a MS 110 having multi-carrier capabilities to signal a radio link failure and to initiate recovery over an alternate carrier or carriers without performing network entry or reentry with the BS 120. In reference to FIG. 4, a diagram illustrating recovery of a radio link according to some embodiments is provided. The method as illustrated in FIG. 4 describes a radio link failure recovery procedure from the perspective of the MS 110, wherein the MS 110 is capable of communicating with a BS 120 over a plurality of carriers including a primary carrier and one or more secondary carriers. A MS 110 configured with multicarrier (MC) capabilities may provide enhanced reliability characteristics when compared to single radio MS, which may need to perform a new entry/reentry procedure in an instance of a radio link failure.

The MS 110 receives MAC signaling and commands, such as those related to handover, sleep, idle, security updates and data over the primary carrier. Data and other messages may be sent from the BS 120 to the MS 110 over one or more secondary carriers. In an embodiment, if the MS 110 is to experience a loss of coverage or a radio link failure, the radio link failure should be declared by the MS 110 when there is a failure over the primary carrier, even if other secondary carriers still provide good quality service.

In this embodiment, the MS 110 is not ordinarily supposed to perform MAC signaling with a BS 120 on a carrier other than the primary carrier. The BS 120 may provide probes to keep alive communications between the BS 120 and the MS 110. If the probes fail to establish communications with the MS 110 on the primary carrier, the BS 120 will start a timer for resource/context retention and discard a dynamic context for the MS 110. The dynamic context may comprise incomplete protocol data units (PDU) for the MAC layer, which may be discarded upon expiration of the timer. At this point, the BS 120 may assume that the MS 110 has dropped from the coverage area or network. The MS 110 may avoid being dropped by the BS 120 by initiating a recovery procedure if the MS 110 detects a radio link failure between the MS 110 and the BS 120. The recovery procedure may need to be completed to sustain the link between the MS 110 and BS 120 and avoid having the BS 120 drop the dynamic context. In an alternate embodiment, the recovery procedure may be initiated by the BS 120. Further, the BS 120 may detect and/or declare a radio link failure between the MS 110 and the BS 120.

As shown in FIG. 4, the UE or MS 110 monitors a radio link quality on a primary carrier in element 410. In this embodiment, the MS 110 has already associated with the BS 120 and established the primary carrier for traffic between the MS 110 and the BS 120. The MS 110 detects coverage loss on the primary carrier, which may be in the form of downlink (DL) control information, in element 420. The MS 110 then determines if recovery on the primary carrier is still possible in element 430. If recovery on the primary carrier is still possible, then the MS 110 tries recovery on the primary carrier in element 440. For example, if a coverage loss condition on the primary carrier improves, then the MS 110 may begin coverage loss recovery on the same primary carrier. If the coverage loss condition does not improve or degrades further, then the MS 110 declares radio link failure on the primary carrier in element 450. If the MS 110 is configured with a single radio, the MS 110 performs full network entry to regain access to the network.

Since the MS 110 has declared the radio link failure on the primary carrier, the MS 110 may not perform recovery on the primary carrier. The multi-carrier MS 110 investigates alternative carriers such as secondary carriers that may still have a requisite link quality. In element 460, the MS 110 picks an alternate carrier and initiates the recovery procedure on the alternate carrier with a valid integrity protection from a previously established and available security context. The BS 120 detects verified signaling from the MS 110 on a second carrier that is not the primary carrier for the MS 110. In an embodiment, the MS 110 may send a RNG-REQ message to the BS 120 by signaling a cover loss recovery bit in a ranging purpose bitmap in element 460.

The BS 120 then determines that the MS 110 has dropped the first primary carrier due to coverage loss, and the BS 120 tries to negotiate with the MS 110 to establish a new primary carrier over the second carrier. The second carrier is established as the new primary carrier in element 460. The methods described in the embodiments of FIG. 4 allow the multicarrier MS 110 to recover from the radio link failure on the primary carrier without performing a full network entry, resulting in enhanced radio link reliability for the MS 110.

FIG. 5 is a diagram illustrating recovery of a radio link from the BS 120 perspective according to some embodiments. The BS 120 may initiate carrier switching, as described earlier, for load balancing purposes and to satisfy quality of service requirements. In the context of carrier switching for a UE or MS 110 configured for multicarrier operation wherein a radio link failure has occurred, the BS 120 detects coverage loss of a MS 110 on a primary carrier in element 510 and receives a request from the MS 110 to perform a recovery procedure in element 520. A context retain timer is investigated to determine if the timer has expired in element 530. If the context retain timer has expired, the BS 120 instructs the MS 110 to perform a full network entry in element 540. If the context retain timer has not expired, it is determined in element 550 whether the recovery request from element 520 is from the first primary carrier. If the request is not from the first primary carrier, the BS 120 assumes that the MS 110 has discarded the first primary carrier in element 560 and MAC layer controls are switched to a second carrier as a candidate primary carrier in element 570. A recovery procedure is initiated in element 580 on the candidate primary carrier. In an embodiment, the recovery procedure is initiated using a MC-CMD message to command the MS 110 to establish the primary carrier on the candidate primary carrier. The primary carrier is established in element 590 on the candidate primary carrier, which previously may have been a secondary carrier for the MS 110.

Figure 6:
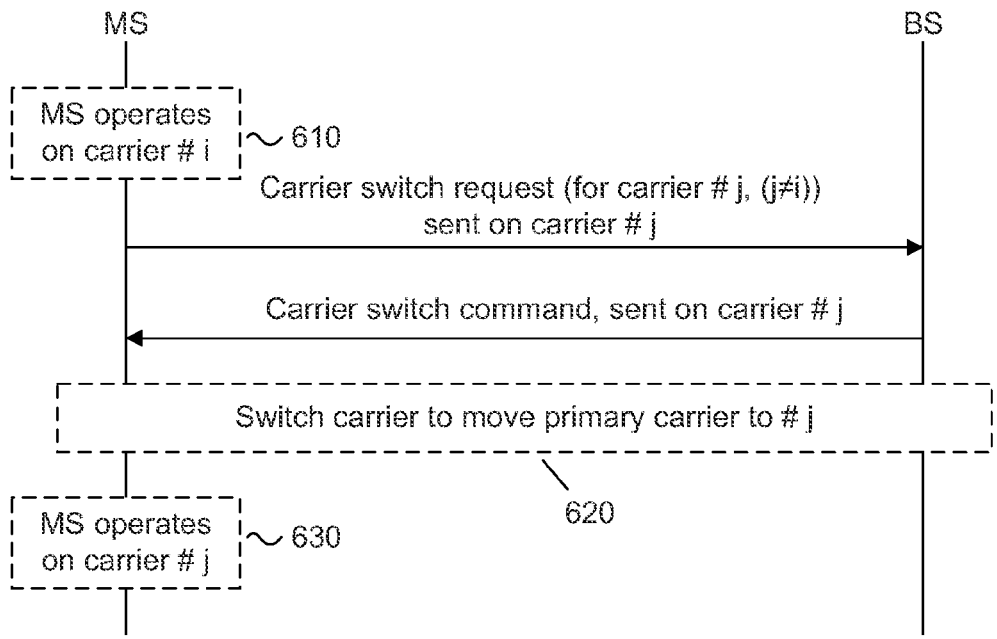
FIG. 6 is a diagram illustrating a primary carrier switching procedure according to some embodiments.

FIG. 6 is a diagram illustrating a primary carrier switching procedure initiated by a UE or MS 110 according to some embodiments. A MS 110 associates with a BS 120 and operates on a carrier #i in element 610. A carrier switch request (for carrier # j) is sent from the MS 110 to the BS 120 on carrier #j, wherein carrier j≠i. The BS 120 sends a carrier switch command on carrier #j to the MS 110 and the carrier is switched to move the primary carrier to carrier #j in element 620. The MS 110 then operates on carrier #j in element 630.

Figure 7:
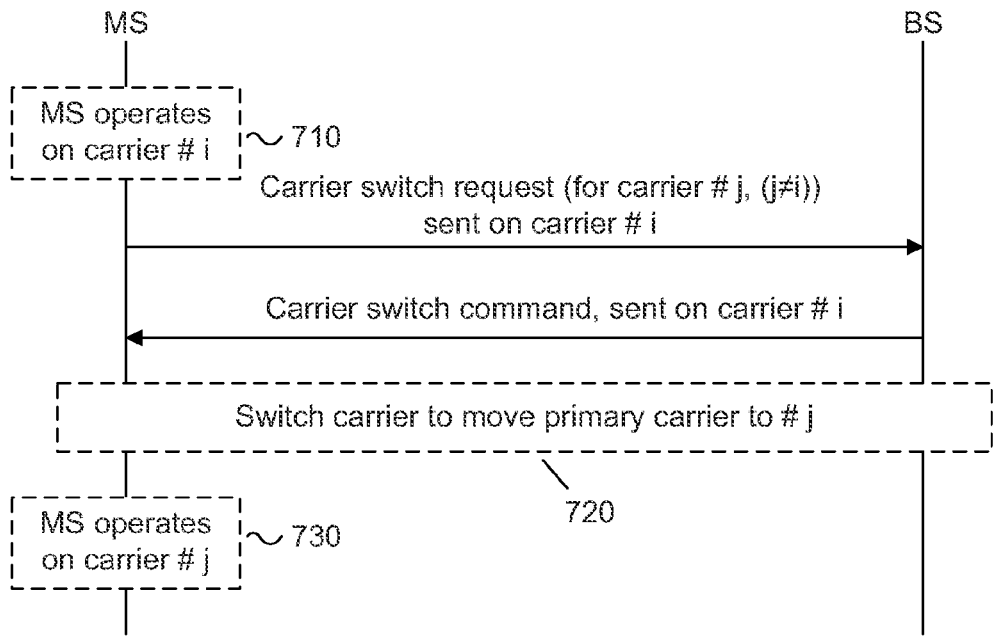
FIG. 7 is a diagram illustrating a primary carrier switching procedure according to some embodiments.

FIG. 7 is an alternate diagram illustrating a primary carrier switching procedure initiated by a UE or MS 110 according to some embodiments. A MS 110 associates with a BS 120 and operates on a carrier #i in element 710. A carrier switch request (for carrier #j) is sent from the MS 110 to the BS 120 on carrier #i, wherein carrier j≠i. The BS 120 sends a carrier switch command on carrier #i to the MS 110 and the carrier is switched to move the primary carrier to carrier #j in element 620. The MS 110 then operates on carrier #j in element 630.

The operation discussed herein may be generally facilitated via execution of appropriate firmware or software embodied as code instructions on tangible media as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within embodiments of the invention.

What is claimed is:

1. A method for multicarrier switching to be performed by a user equipment (UE), comprising:

associating the UE with a base station (BS), wherein the UE is configured for contemporaneous communication with the BS over a plurality of carriers, the plurality of carriers including a single primary carrier on which the UE is to receive security information via Media Access Control (MAC) signaling and one or more secondary carriers on which the UE does not receive security information via MAC signaling;

establishing MAC layer security and mobility contexts using the security information received on the primary carrier;

monitoring a link quality on the primary carrier;

detecting degradation of the link quality on the primary carrier;

determining, upon detecting the degradation, that recovery on the primary carrier is not possible;

declaring, based on the determination that recovery on the primary carrier is not possible, a radio link failure (RLF) on the primary carrier, wherein the RLF is declared by the UE;

selecting a target secondary carrier from the one or more secondary carriers; and establishing a new primary carrier on the target secondary carrier; and communicating with the new primary carrier using the MAC layer security and mobility contexts.

2. The method of claim 1, wherein the UE is configured to communicate using a mobile WiMAX protocol.

3. The method of claim 1, wherein the RLF is transmitted to the BS.

4. The method of claim 1, further including receiving a keep-alive probe from the BS to re-establish communications with the UE on the primary carrier.

5. The method of claim 1, wherein the target secondary carrier is an alternate carrier with a valid integrity protection from a previously established security context.

6. A user equipment (UE) comprising a media access control (MAC) layer and a physical (PHY) layer, wherein the UE is configured to contemporaneously communicate on a plurality of carriers including a single primary carrier on which the UE is to receive security information via MAC signaling and one or more secondary carriers on which the UE does not receive security information via MAC signaling, wherein the UE is further configured to perform multicarrier switching between the primary carrier and the one or more secondary carriers by:

detecting degradation of a link quality on the primary carrier, attempting a recovery procedure on the primary carrier, determining that the recovery procedure on the primary carrier was unsuccessful, identifying the one or more secondary carriers, selecting a target secondary carrier from the one or more secondary carriers, and establishing a new primary carrier on the target secondary carrier.

7. The UE of claim 6, wherein the UE is configured to communicate using a long term evolution (LTE) protocol.

8. The UE of claim 6, wherein the multicarrier switching further comprises declaring a radio link failure (RLF).

9. The UE of claim 8, wherein the multicarrier switching further comprises transmitting the RLF to a base station.

10. The UE of claim 6, wherein the UE is further configured to receive a keep-alive probe from a base station to re-establish communications with the UE on the primary carrier.

11. The UE of claim 6, wherein the UE further comprises multiple antennas.

12. The UE of claim 6, wherein the primary carrier and the secondary carrier are managed by a common MAC layer.

* * * * *